United States Patent
Wu et al.

(10) Patent No.: US 7,123,606 B2
(45) Date of Patent: Oct. 17, 2006

(54) VOICE OVER IP DEVICE CAPABLE OF AUTO-SELECTIVELY DIALING UP PUBLIC SWITCH TELEPHONE OR INTERNET PHONE AND THE METHOD THEREOF

(75) Inventors: Pai-Chin Wu, Hsinchu (TW); Chien-Hsiu Lee, Hsinchu (TW)

(73) Assignee: D-Link Corp., Hsinchu (TW)

( * ) Notice: Subject to any disclaimer, the term of this patent is extended or adjusted under 35 U.S.C. 154(b) by 884 days.

(21) Appl. No.: 09/888,491

(22) Filed: Jun. 26, 2001

(65) Prior Publication Data
US 2002/0196777 A1 Dec. 26, 2002

(51) Int. Cl.
*H04L 12/66* (2006.01)
*H04L 1/00* (2006.01)
*H04M 1/64* (2006.01)

(52) U.S. Cl. .............. 370/352; 370/217; 370/463; 379/88.17

(58) Field of Classification Search ........ 370/352–353, 370/351–356, 463; 379/88.17
See application file for complete search history.

(56) References Cited

U.S. PATENT DOCUMENTS

| | | | |
|---|---|---|---|
| 6,243,376 B1 * | 6/2001 | Ng et al. .............. | 370/352 |
| 6,243,377 B1 * | 6/2001 | Phillips et al. ......... | 370/354 |
| 6,424,647 B1 * | 7/2002 | Ng et al. .............. | 370/352 |
| 6,424,648 B1 * | 7/2002 | Ng et al. .............. | 370/352 |
| 6,690,789 B1 * | 2/2004 | Hamilton ............... | 379/279 |
| 2001/0012285 A1 * | 8/2001 | Shaharabani et al. ..... | 370/352 |

* cited by examiner

*Primary Examiner*—Chi Pham
*Assistant Examiner*—Tri H. Phan
(74) *Attorney, Agent, or Firm*—Bacon & Thomas, PLLC

(57) ABSTRACT

The invention relates to a voice over internet protocol device capable of auto-selectively dialing up public switch telephone network or internet phone, said voice over internet protocol device can base on preset operation mode to detect if there is an in-coming call ringing signal transmitted from public switch telephone network thereon, if there is one, then the employment status of at least one terminal apparatus connected with said voice over internet protocol device can be based on making unused terminal apparatus be transferred to a loop which the said public switch telephone network is connected thereon.

6 Claims, 2 Drawing Sheets

VOICE OVER IP DEVICE CAPABLE OF AUTO-SELECTIVELY DIALING UP PUBLIC SWITCH TELEPHONE OR INTERNET PHONE AND THE METHOD THEREOF

FIELD OF THE INVENTION

The invention relates to a voice over IP device, more particularly to a voice over IP device capable of auto-selectively dialing up public switch telephone or internet phone and the method thereof.

PRIOR ART

Whereas the last decades, due to rapid development in science and technology industry, living and working pace for human being speed up with present hard competitive market, and convenient and rapid traffic facilities also make industry and commerce development region gradually expand. People live with daily busy schedule, to enhance communication efficiency, and further improve quality for work and life, the degree for depending on communication devices, such as telephone, etc., is steadily on the increase. Nowadays, communication devices, such as telephone, etc., not only become necessary communication means in peoples' daily life and work, and under some emergency, the apparatus may further become a life-saving means. Therefore, under any time and condition, to ensure the communication apparatus being unimpeded becomes focus which general users and communication service provider all concern about.

During recent years, due to the new developed voice over IP device (VoIP), which provides with a relatively cheap charge standard for users who usually use long-distance or international telephone to proceed communication, which makes the said users indeed find that using the said VoIP to proceed communication can save considerable communication expense than former telephone using public switch telephone network(PSTN). Whereas, providers make investigative research aiming at the requirement and tendency, the result of which exhibits that there are up to 70% traditional PSTN users represent they are interested in changing to proceed communication on line using VoIP to effectively reduce the expense on communication.

However, at present, all VoIP 11 sold on the market, referring to FIG. 1, connect with a rectifier 12 to insert to a power supply socket through a plug 13 in the other terminal of the rectifier 12, to provide the power supply necessary for normal operation of the VoIP 11, the VoIP 11 can connect with at least one phone 10, and translate voice signal transmitted from the phones 10 to digital signal, and then proceed with packet process, and transmit the formed IP packet out, to transmit the said packet to an internet server 15 through a network switch device 14, and proceed communication on line with remote phone which is provided with similar device through the server 15.

Due to the traditional VoIPs 11 must connect with external power supply to maintain in normal operation, therefore once power failure happened, the VoIPs 11 will make communication off line, which makes communication on line cannot continue, such phenomenon may result in severe influence and inconvenience under some emergency. Thus, to solve the pre-described problem, the VoIP providers specifically increase a line transfer switch on the traditional VoIPs, and through the line transfer switch connects with at least one phones, translate the voice signal transmitted from the phones to digital signal, and then proceed with packeting process through a control circuit equipped thereon to form a IP packet, and then proceed communication on line with remote on-line phone which is provided with similar device through a internet. While the power supply of the VoIPs break, the line transfer switch can be ordered to auto-switch to the mode which connects with a PSTN, which makes the phones can use power supply fed from the central office line of the PSTN to communicate with remote phones.

Though such kind of solution can solve the trouble that the traditional VoIPs cannot continue communicating while power failure happened, under normal condition, the traditional VoIPs is confined in providing on-line communication service through internet, and cannot enable users to auto-select dial-up of PSTN and internet phone(I-phone) through the traditional VoIPs.

SUMMARY OF THE INVENTION

Whereas the pre-described traditional VoIP cannot auto-select dial-up between PSTN and I-phone, the inventor investigates one kind of VoIP which can auto-select dial-up of PSTN and network telephone and method thereof the invention is desired to effectively improve the defects of traditional VoIP, and make it possible, in any case, to communicate with remote terminal through the traditional VoIP for dial-up of PSTN or I-phone.

One object of the invention is to make a control circuit of the VoIP connect with at least one line transfer switch through a phone detection circuit, respectively, to use the phone detection circuit to detect the status of at least one phone connected with the VoIP, and the circuit transfer switch detects the in-coming call ringing signal transmitted from PSTN through a ringing detection circuit established on a loop, and while the ringing signal is detected, the message will be transmitted instantly to the control circuit such that the control circuit can, according to the phone status detected by the phone detection circuits, trigger a signal to transfer the circuit transfer switches, which makes the unused phone be auto-transferred to status which connects with the loop, to receive the ringing signal transmitted from PSTN, such that the user can communicate with remote phone through the PSTN while picking up the phone.

Another object of the invention is to trigger a signal by the control circuit while power supply of the VoIP is off, which makes the phones be automatically transferred to status which connects with the loop, such that the phones can communicate with remote phone directly through the PSTN. When the power supply of the VoIP returns to normal, the control circuit can regenerate a trigger signal to make the phones be auto-transferred to proceed on-line communication with remote phones provided with similar device on the internet through a subscriber line interface circuit(SLIC) Therefore, in any case, it is possible to make the VoIP maintain in unimpeded communication status.

Further object of the invention is the control circuit can make the VoIP provide with service for dial-up of PSTN and I-phone in the meantime according to the auto-detection mode set thereon, and make the phones can automatically dial-up of PSTN or I-phone to communicate with remote terminal.

DESCRIPTION OF APPENDED DRAWINGS

DETAILED DESCRIPTION

Whereas the VoIP generally connects with at least one phones, transfers the voice signal transmitted from the phones to digital signal, and then proceeds packet process to form IP packet, and uses internet to proceed on-line communication with the phones which provide with similar devices on the remote internet. Such kind of communication processing is much cheaper in communication rate than existed long distance and international call, thus it is with great advantage in development. However, traditionally, the phone use PSTN to proceed communication, due to its power supply is fed from telecommunication office through central office line, the phone needs no external power supply and can proceed communication directly. Furthermore, due to the communication engine room of the telecommunication office is generally equipped with isolated spare generator, once the electricity supply is broken the spare generator still can instantly supply the electricity, and thus the communication engine room of the telecommunication office can operate normally, and make no influence on the operation of the phone and still can continue communicating externally, so there still are advantages which are hard to be obliterated on the characteristics of traditional PSTN.

Figure 1:
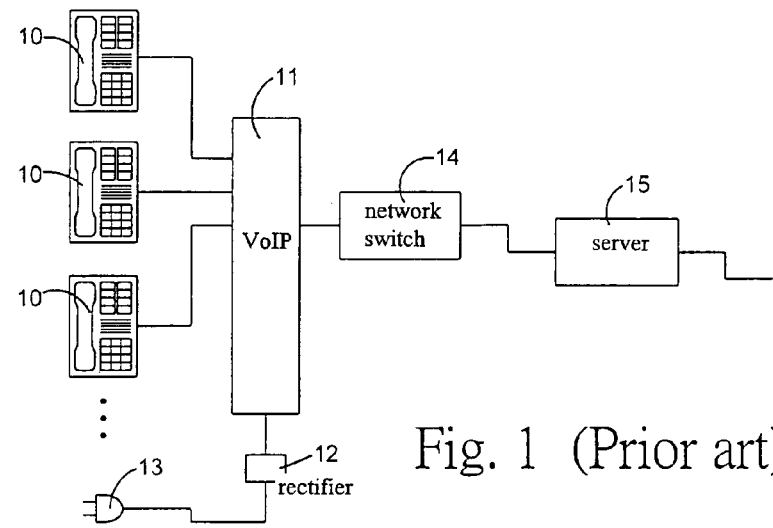
FIG. 1 shows the schematic diagram of line structure in traditional VoIP.
Figure 2:
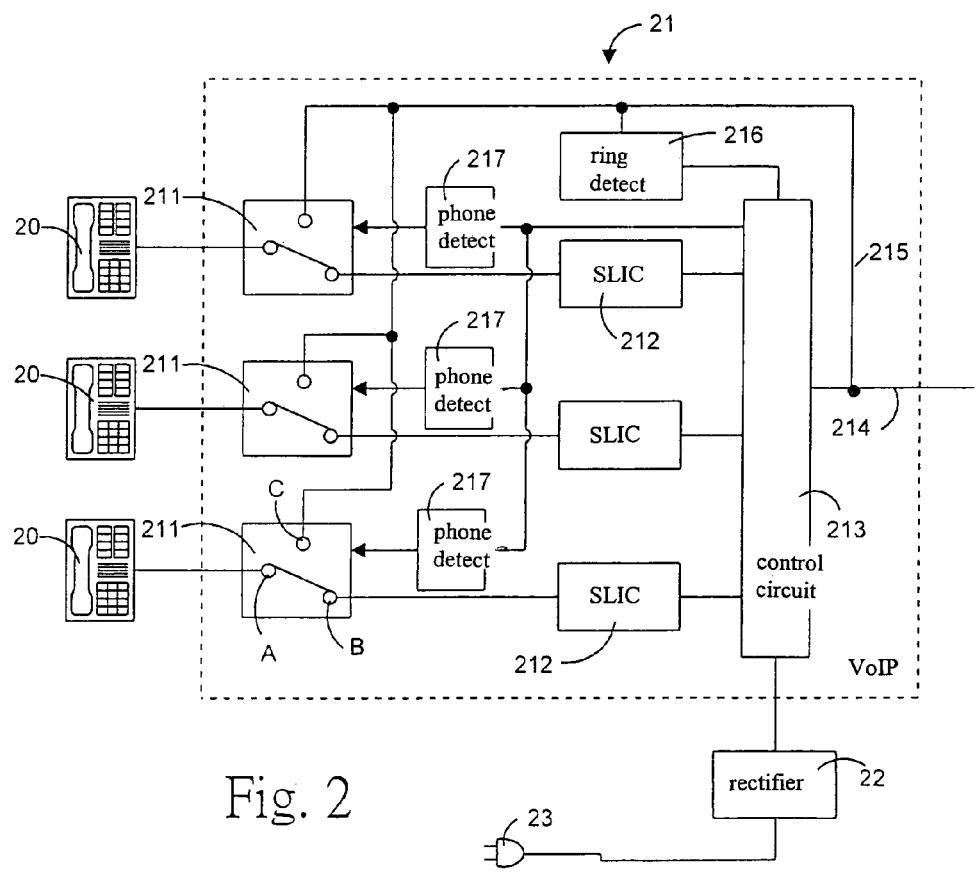
FIG. 2 shows the block schematic diagram of circuit structure in traditional VoIP of the invention.

The present invention uses above-mentioned function peculiar to VoIP and PSTN to develop a VoIP 21 which can dial-up simultaneously PSTN and I-phone. Referring to FIG. 2, in one preferred exemplary of the invention, the VoIP includes mainly a control circuit 213, the control circuit 213 connects with at least one SLIC 212, thus the SLIC 212 can connect with at least one phone 20 (it is not limited for the other exemplary of the invention, and can be other terminal devices, such as fax or modem, etc.), respectively, through a line transfer switch 211, and transfer the voice signal transmitted from the phone 20 to digital signal, then proceed packet process through the control circuit 213 to produce corresponding IP packet, and which can be transmitted one by one through a signal line 214, such that on-line communication can proceed with remote phone provided with similar devices on the net through internet.

Figure 3:
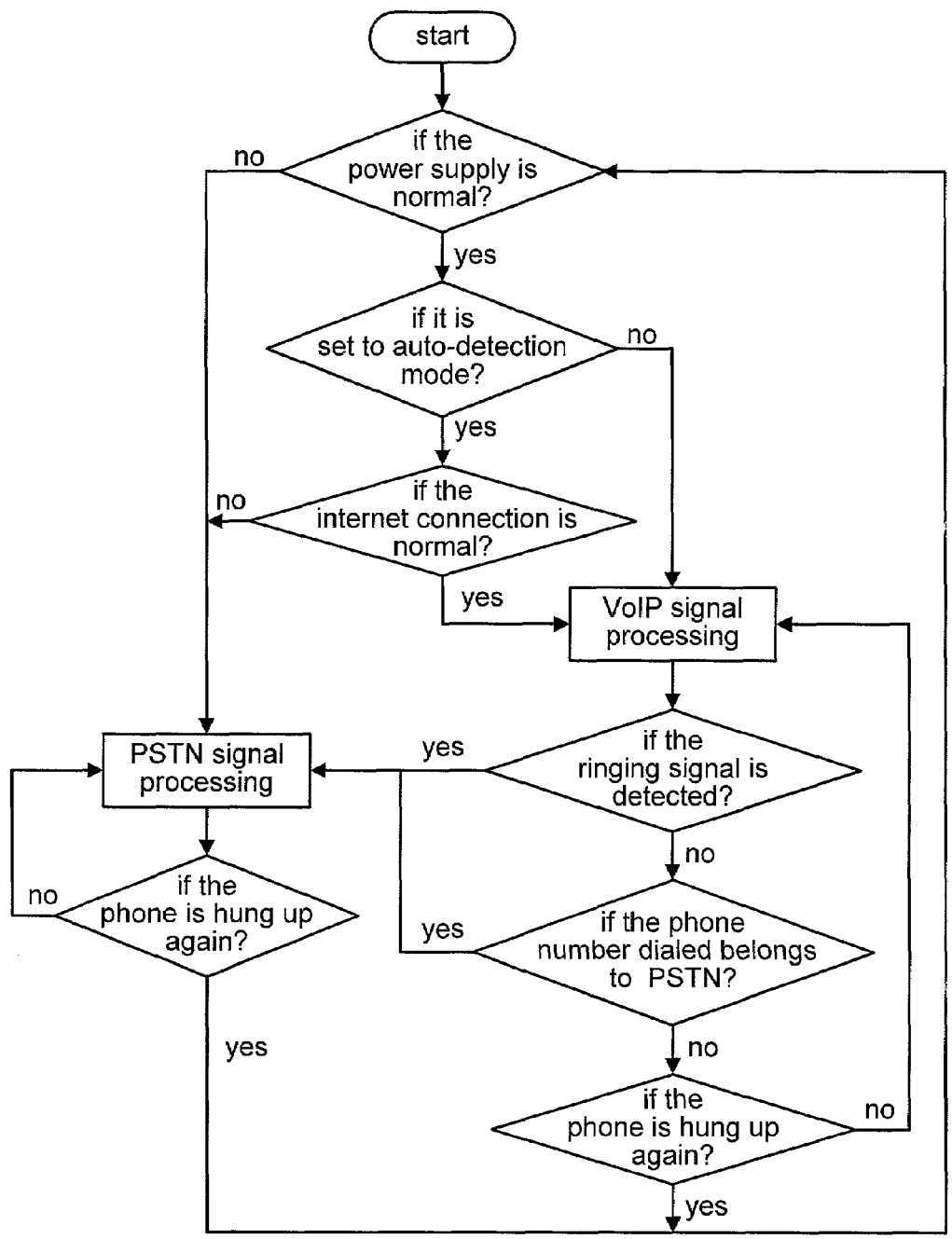
FIG. 3 shows the schematic diagram of system flow of the invention

In the embodiment, referring to FIGS. 2 and 3, the control circuit 213 further connects with the line transfer switch 211 through a phone detection circuit 217, respectively, such that the phone detection circuit 217 can detect the status(on-hook or off-hook) of at least one of the phone 20 connected with the VoIP 21. The line transfer switch 211 is equipped with a plurality of signal contact respectively, wherein one signal contact A connects with the phone 20, another signal contact B connects with the SLIC 212, and the other signal contact C connects with the signal line 214 through a loop 215. The loop 215 is equipped with a ringing detection circuit 216, through which the in-coming call ringing signal transmitted from PSTN can be detected, and while the in-coming call ringing signal is detected, the message of which is transmitted to the control circuit 213 instantly, such that the control circuit 213 can trigger a signal, according to the status(on-hook or off-hook) of the phone 20 detected through the phone detection circuit 217, to transfer the line transfer switch 211, or can transfer the line transfer switch 211 through the said SLIC 212, to make the unused phone 20(on-hook) be auto-transferred to the status which connects with the loop 215 to receive the ringing signal transmitted from the PSTN, or a local ringing signal is produced through the SLIC 212, such that after subscriber picks up the phone 20, communication with remote phone can sequentially proceed through the loop 215, the signal line 214, and the PSTN.

Furthermore, the control circuit 213 is connected with a rectifier 22, further referring to FIG. 2, such that the plug equipped in another terminal of the rectifier 22 can be made to plug in the socket of an external power supply to supply the power required for the control circuit 213 being in normal operation. And the control circuit 213 can depend on the power supply status of the rectifier 22 to produce a trigger signal which makes the line transfer switch 211 proceed transfer operation. Thus, when the power supply for the VoIP 21 is broken, further referring to FIG. 3, the control circuit 213 can trigger a signal to make the phones 20 be transferred to the status which connects with the loop 215, such that the voice signal produced by the phones 20 can be directly transmitted outside through the signal line 214. Thus, while the power supply for the VoIP 21 is broken, the phones still can use power supplied by the central office line of PSTN to achieve the object of communicating with remote phone. When the VoIP 21 recovers to normal power supply status, the control circuit 213 will regenerate a trigger signal to make the signal contacts A, B maintain in on-status, such that the voice signal produced by the phones 20 can proceed with on-line communication with remote phone provided with similar devices on the internet through the SLIC 212 and the control circuit 213. Therefore, in any case, it is possible to make the VoIP 21 maintain in unimpeded communication status.

In another preferred embodiment of the invention, the signal contact C can directly be connected with the central office line of the PSTN through the loop 215, and the control circuit 214 can transmit the produced IP packet to the internet through the signal line 214.

In further preferred embodiment of the invention, re-referring to FIG. 3, the control circuit 213 still can provide the subscriber to self-set the environment of the operation mode according to the set operation procedure thereon, so when the subscriber opens the power supply of the VoIP 21, the desired operation mode can be aimed to proceed with setting. Now, if the control circuit 213 judges that the operation mode set by the subscriber belongs to a auto-detection mode, then through the ringing detection circuit 216 to detect if there is in-coming call ringing signal transmitted from PSTN, if there is any, then according to the status(on-hook or off-hook) of the phones 20 detected by the phone detection circuit 217, the control circuit 213 will control the circuit transfer switches 211, or through the SLIC 212 to transfer the circuit transfer switches 211, which makes the unused phone 20(on-hook) be transferred to the status which connects with the loop 215 to receive the ringing signal transmitted from PSTN, which makes the subscriber can receive in-coming call at any time and communicate with remote phone; when the ringing signal disappears and the phone 20 backs to standby status, the control circuit 213 will drive the circuit transfer switches 211, which makes the phone 20(on-hook) be transferred back to the status which connects with the SLIC 212.

While subscriber calling through the phones 20, the control circuit 213 will aim at the phone number dialed by the subscriber to judge which belongs to a PSTN of a I-phone, and bases on which to control the circuit transfer switches 211, which makes the used phone 20(on-hook) be transferred to the status which connects with the loop 215 or the SLIC 212, which makes it possible to communicate with remote phone through PSTN or I-phone, respectively.

The invention claimed is:
1. A voice over internet protocol device for auto-selectively dialing up a public switched telephone network or an internet phone, said voice over internet protocol device comprising:
at least one line transfer switch, which connects with a terminal apparatus to receive a voice signal produced by said terminal apparatus;

a control circuit, which is used to control each component in the entire device, and proceeds with packet processing for the signal received to produce a corresponding internet protocol packet;

wherein at least one subscriber line interface circuit is connected to said at least one line transfer switch and to said control circuit to transform the voice signal transmitted from said terminal apparatus to a digital signal and then to transmit the digital signal to the control circuit to proceed with packet processing in order to carry out an internet telephone call by transmitting the internet protocol packet via the internet to the internet phone, wherein, in case a power supply failure is detected, the control circuit is connected to the line transfer switch to produce a trigger signal that causes the at least one line transfer switch to transfer a voice signal produced by said terminal apparatus from said at least one subscriber line interface circuit to said public switched telephone network, to thereby carry out voice communications over the public switched telephone network until power is restored;

a rectifier, which connects with said control circuit to supply said control circuit with power required for its normal operation;

at least one phone detection circuit, which is connected with said at least one line transfer switch and said control circuit to detect an employment status of said terminal apparatus;

a ringing detection circuit, which is connected with said at least one line transfer switch and a loop to detect an in-coming call ringing signal transmitted from the public switched telephone network through said loop, wherein when said in-coming call ringing signal is detected, according to the employment status of said terminal apparatus detected by said at least one phone detection circuit, said control circuit supplies an in-coming call transfer signal to cause said at least one line transfer switch to connect said terminal apparatus with said loop to receive said ringing signal when the employment status of said terminal apparatus is that the terminal apparatus is unused, and when said terminal apparatus is picked up, to enable communication with a remote terminal apparatus to proceed through said public switched telephone network.

2. The processing method for the voice over internet protocol device for auto-selectively dialing up a public switched telephone network or an internet phone according to claim 1, wherein there are a plurality of signal contacts equipped on said line transfer switch, wherein a first signal contact connects with said terminal apparatus, and a second signal contact connects with said subscriber line interface circuit, such that while said control circuit is in a normal power supply status, a trigger signal is produced to make said first and second signal-contacts maintain an electric connection status.

3. The processing method for the voice over internet protocol device for auto-selectively dialing up a public switched telephone network or an internet phone according to claim 2, wherein there is a third signal contact equipped on said line transfer switch, said third signal contact connecting with said public switched telephone network through said loop, such that while the power supply for said control circuit is broken, said trigger signal causes said first and second signal contacts to be in an open status, and causes said third signal contact to be transferred to an electric connection status with said first signal contact.

4. A processing method for a voice over internet protocol device capable of auto-selectively dialing up a public switched telephone network or an internet phone, comprising the steps of:

causing a line transfer switch to connect a subscriber line interface circuit with at least one terminal apparatus, said subscriber line interface circuit being arranged to transform a voice signal transmitted from said terminal apparatus into a digital signal and to transform a digital signal received from a control circuit into an in-coming voice signal;

placing said voice over internet protocol device in a preset operation mode;

detecting an in-coming call ringing signal transmitted from said public switched telephone network upon detection of an in-coming call ringing signal transmitted from the public switched telephone network, checking an employment status of at least one said terminal apparatus connected with said voice over internet protocol device;

if at least one said terminal apparatus is unused, causing said line transfer switch to disconnect the unused terminal apparatus from the subscriber line interface and connect the unused terminal apparatus to a loop which is connected with said public switched telephone network, thereby disconnecting the terminal apparatus from the internet and transferring said in-coming ring signal from said public switched telephone network to said unused terminal apparatus; and when a power supply failure is detected, causing the line transfer switch to transfer a voice signal produced by said terminal apparatus from said subscriber line interface circuit to said public switched telephone network, thereby enabling communications with a remote phone that were originally carried out over the internet to continue over the public switched telephone network despite an interruption in a supply of power to said voice over internet protocol device.

5. The processing method for the voice over internet protocol device for auto-selectively dialing up a public switched telephone network or an internet phone according to claim 4, wherein when the ringing signal disappears and said terminal apparatus is in unused status again, said voice over internet protocol device causes said terminal apparatus to be transferred back to a connection with said subscriber line interface circuit to re-connect said terminal apparatus with the internet through said subscriber line interface circuit.

6. The processing method for the voice over internet protocol device for auto-selectively dialing up a public switched telephone network or an internet phone according to claim 5, wherein said voice over internet protocol device detects a phone number dialed in said terminal apparatus to judge that the phone corresponding to said phone number dialed in said terminal apparatus belongs to the public switched telephone network or the internet phone, such that said voice over internet protocol device selectively transfers said terminal apparatus between a status which connects said terminal apparatus with said loop and a status which connects said terminal apparatus with said subscriber line interface circuit depending on whether said phone number dialed in said terminal apparatus is a phone number of a phone on the public switched telephone network or the internet phone.

\* \* \* \* \*